United States Patent [19]
Moertl et al.

[11] Patent Number: 5,666,560
[45] Date of Patent: Sep. 9, 1997

[54] STORAGE METHOD AND HIERARCHICAL PADDING STRUCTURE FOR DIRECT ACCESS STORAGE DEVICE (DASD) DATA COMPRESSION

[75] Inventors: Daniel Frank Moertl; John Douglas Stevens; Gene Steven Van Grinsven; Bruce Marshall Walk, all of Rochester, Minn.

[73] Assignee: International Business Machines Corporation, Armonk, N.Y.

[21] Appl. No.: 510,804

[22] Filed: Aug. 3, 1995

[51] Int. Cl.⁶ .............................. G06F 12/02; G06F 12/08
[52] U.S. Cl. .............................. 395/888; 395/439; 360/48
[58] Field of Search .............................. 395/439, 888, 395/821, 442, 427; 369/48, 124; 341/50; 360/71, 48

[56] References Cited

U.S. PATENT DOCUMENTS

| | | | |
|---|---|---|---|
| 4,499,539 | 2/1985 | Vosacek | 395/600 |
| 5,021,946 | 6/1991 | Korty | 395/600 |
| 5,113,512 | 5/1992 | Miki et al. | 395/416 |
| 5,237,675 | 8/1993 | Hannon, Jr. | 395/888 |
| 5,325,347 | 6/1994 | Sako | 369/48 |
| 5,390,315 | 2/1995 | Blandy et al. | 395/439 |
| 5,394,534 | 2/1995 | Kulakowski et al. | 395/439 |
| 5,410,671 | 4/1995 | Elgamal et al. | 395/412 |
| 5,488,364 | 1/1996 | Cole | 341/50 |
| 5,537,658 | 7/1996 | Bakke et al. | 395/888 |

*Primary Examiner*—Gopal C. Ray
*Attorney, Agent, or Firm*—Joan Pennington; Owen J. Gamon

[57] ABSTRACT

A data compression storage method and data compression hierarchical padding structure are provided for a direct access storage device (DASD) using fixed block architecture (FBA). A minimum page allocation defining a minimum number of sectors allocated for each logical compressed data page is selected. The DASD is segmented into at least one compression group. Each compression group has a fixed logical size and includes a selected number of DASD compressed data pages with an initial page allocation of a number of sectors. The initial page allocation is greater than or equal to the minimum page allocation. A minimum number of compressed data regions is allocated within each compression group. A selected number of additional compressed data regions including a plurality of sectors for padding is allocated within each compression group. The plurality of padding sectors are distributed between the compression pages. An exception region is allocated within each compression group. Compressed data is written to a selected DASD compressed data page and typically updated in place. Compressed data is written and updated to the selected DASD compressed data page using sector borrowing of available free sectors from adjacent pages if needed.

24 Claims, 9 Drawing Sheets

FIG.4   WRITE

FIG.5A

COMPRESSION GROUP REORGANIZATION

SECTOR BORROWING

STORAGE METHOD AND HIERARCHICAL PADDING STRUCTURE FOR DIRECT ACCESS STORAGE DEVICE (DASD) DATA COMPRESSION

FIELD OF THE INVENTION

The present invention relates to a data compression storage method and data compression hierarchical padding structure for a direct access storage device (DASD) using fixed block architecture (FBA).

DESCRIPTION OF THE PRIOR ART

Computers often include auxiliary memory storage units having media on which data can be written and from which data can be read. Disk drive units or DASDs, often incorporating stacked, commonly rotated rigid magnetic disks, are used for storage of data in magnetic form on the disk surfaces. Data is recorded in radially spaced data information tracks arrayed on the surfaces of the disks. Transducer heads driven in a path toward and away from the drive axis write data to the disks and read data from the disks. A data cylinder includes a set of corresponding data information tracks for the stack of disk surfaces. In a DASD using fixed block architecture (FBA), the data information tracks are divided into equally sized segments or sectors. Each sector is assigned a number or logical block address (LBA). Typically, a data file is written and read using consecutive LBA's, trackfollowing on the data information tracks of successive consecutive logical data surfaces from the starting LBA. Fragmentation occurs when blocks of data from the file are written to available discontinuous sectors at different locations on the DASD.

To utilize the relatively limited amount of the available data storage capacity of DASDs, data may be stored by a compression technique. However to effectively utilize DASDs, response time should be both predictable and fast. Response time consistency is an extremely important consideration. In cases of heavy work load, response time must at least be predictable. For batch operations, businesses typically rely on certain windows of low system load to run background applications. If time requirements for these applications are not consistent and predictable, it becomes difficult to schedule the work flow, potentially resulting in windows of time where the system is heavily overloaded.

The operational characteristics of DASDs that do not use data compression provide a yardstick by which consistency and operational predictability are measured. When compression is enabled on commercial systems, response time consistency should be similar to DASD subsystem without data compression.

All data does not compress uniformly, and the compression ratio for a given data block can vary greatly as that data block is modified. These two aspects of data compression result in unique problems for data that is to be stored on the DASD. One of these problems is containing the performance impact encountered when compressed data grows due to modification. DASD performance is negatively impacted when data, once written to the device, is modified such that its new compressed length exceeds the amount of DASD space allocated for it. In this case, this data must now be written to a new location and the directory updated to reflect this data movement and typically the old data must be invalidated. In addition to this immediate performance impact, a latent performance impact occurs due to the DASD fragmentation resulting from this data movement. Data groups which typically are used together have been scattered across the DASD.

Performance sensitive applications that characteristically use volatile data, such as those typically found on transaction processing and interactive systems, cannot allow for this performance degradation, and therefore do not use data compression for storing data on an associated DASD. DASD data compression is typically only used for archival purposes where the data is rarely, if ever is modified, or on systems in which efficient use of DASD capacity is a higher priority than performance.

A need exists for a mechanism that allows frequently modified data to be stored in compressed format, while enabling update in place such that performance is not severely impacted. Update in place describes the ability to take compressed data that has grown due to modification, and continue to store it in the same location on the DASD. Update in place reduces and limits the amount of fragmentation that will exist on the DASD, and guarantees locality of reference of various data blocks.

SUMMARY OF THE INVENTION

Principal objects of the present invention are to provide an improved data compression storage method and data compression hierarchical padding structure for a direct access storage device (DASD) using fixed block architecture (FBA); to provide such data compression storage method and data compression hierarchical padding structure that enables frequently modified data to be stored in compressed format and enabling update in place; and to provide such data compression method and data compression hierarchical padding structure that overcome many of the disadvantages of prior art arrangements.

In brief, a data compression storage method and data compression hierarchical padding structure are provided for a direct access storage device (DASD) using fixed block architecture (FBA). A minimum page allocation defining a minimum number of sectors allocated for each logical compressed data page is selected. The DASD is segmented into at least one compression group. Each compression group has a fixed logical size and includes a selected number of DASD compressed data pages with an initial page allocation of a number of sectors. The initial page allocation is greater than or equal to the minimum page allocation. A minimum number of compressed data regions is allocated within each compression group. A selected number of additional compressed data regions including a plurality of sectors for padding is allocated within each compression group. The plurality of padding sectors are distributed between the compression pages. An exception region is allocated within each compression group. Compressed data is written to a selected DASD compressed data page and typically updated in place.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
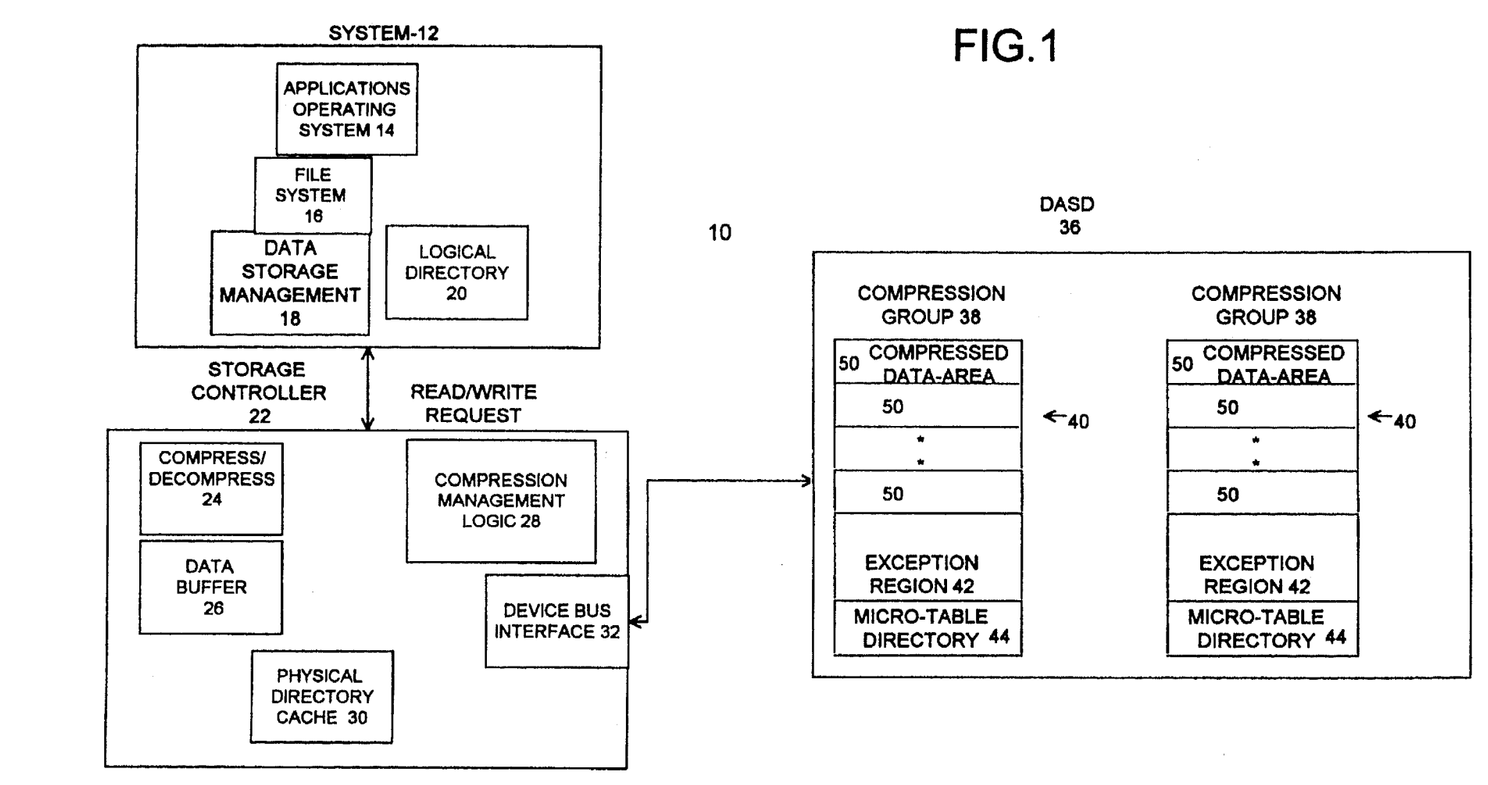
FIG. 1 is a block diagram illustrating a system employing a storage controller for implementing integrated direct access storage device (DASD) compression and a data compression structure in accordance with the present invention.

Referring now to the drawings, in FIG. 1 there is illustrated a block diagram representation of an exemplary system generally designated by 10 for performing a data compression method of the invention. As illustrated, the exemplary system 10 includes a data processing or host system generally designated by 12. Host system 12 includes an application operating system 14, a file system 16 and a direct access storage device (DASD) data storage management function 18 used to store data onto at least one DASD 36. DASD storage management function 18 includes a logical directory 20 that stores the logical block addresses where data is placed on the associated DASD or DASDs 36.

Data is accessed on the DASD 36 through a storage controller generally designated by 22 that compresses data when it is written to the DASD and decompresses data when it is read from the DASD. Storage controller 22 includes a compression and decompression functional block 24, a data buffer 26 for storing data, a compression management logic block 28 for performing address translation and a physical directory cache 30 that is used for storing cache directory elements of the DASD directory generated within the storage controller 22. Storage controller 22 receives data pages from the host system 12, compresses it, and creates compressed data pages to be stored in sectors, appending compression headers that enable directory recovery to occur. Once the physical location of data on DASD is determined by the compression management logic 28, compressed data is passed to or received from the DASD 36 via a device bus interface 32.

DASD 36 includes a plurality of variable sized compression groups 38, each compression group is used for storing related host system data. Each compression group includes a compressed data area 40 for storing original and updated compressed data, an exception region 42 for storing updated compressed pages that are larger than their original allocated space and a directory or micro table 44 for locating data within the compression group. The compressed data area 40 consists of multiple compression regions 50. A feature of the invention is that compressed data is organized on DASD 36 so that the spatial relationships of related data are maintained within each compression group 38, together with necessary space management parameters. The resulting structure of the compressed data provides consistent performance in a commercial environment and minimizes performance impact due to using data compression.

Figure 1A:
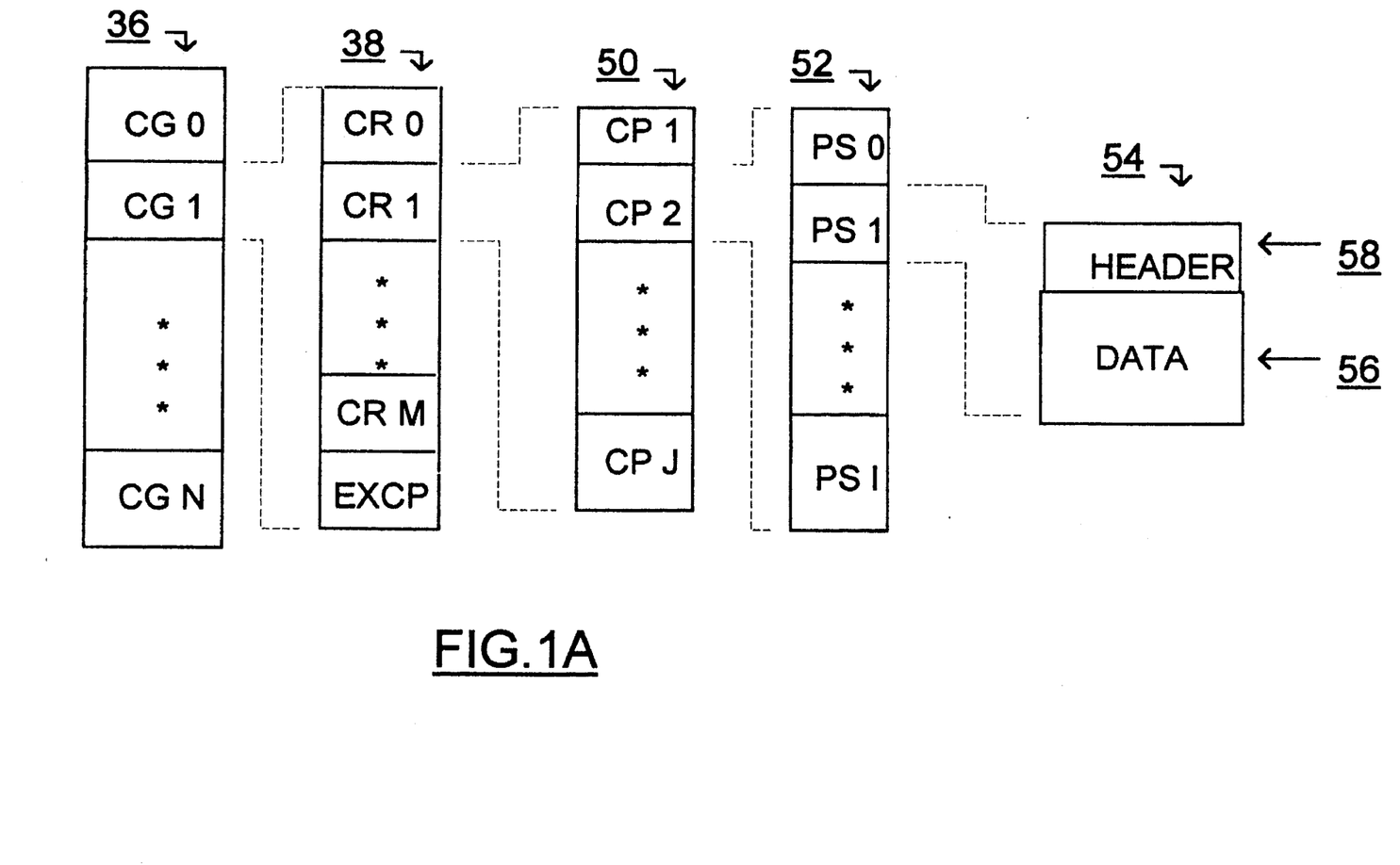
FIG. 1A is a block diagram illustrating a data compression structure in accordance with the present invention.

The present invention provides a hierarchical padding mechanism and compression data storage method to increase the probability of update in place on the DASD 36 which utilizes a data compression structure as shown in FIG. 1A. An important feature of the invention is the provision of a minimum page allocation. The minimum page allocation (MPA) allows the user of data compression (DASD compression management logic 28, storage management 18, customer, etc.) to specify the minimum amount of space or a number of physical sectors (PSs) that must be allocated or set aside for each logical page within a compression group 38. For example, specifying a value of 1 or one PS for a logical page allows for maximum data packing and provides the smallest opportunity for update in place, while a value of 8 or eight PSs for a logical page generally guarantees that update in place will be possible, but provides no space savings for the compressed data as compared to uncompressed data.

Selecting a value between two through seven, inclusive, provides selectively varying compression space savings, while resulting in varying degrees of data response time variability. With two through seven sectors allocated for each logical page, a given page may have one or more completely unused physical sectors or free sectors (FS) associated with it. If compressed data is modified such that it exceeds its current size, but can be accommodated by the current number of used sectors and any free sectors associated with the physical page, the logical page will be updated in place without any performance penalty.

Various levels of padding or growth areas are selectively provided into the compression data structure for the placement of compressed data on the DASD 36. Padding results in compressed data with a reduced compression ratio or that is not as tightly packed as could be obtained otherwise; however, the padded compressed data has greater opportunity to be updated in place to yield significant performance improvements for frequently modified data.

Another important feature is a sector borrowing feature of compression data storage method of the invention. When a modified compression data page will not fit within its currently allocated space, sectors may be borrowed from adjacent pages in accordance with the invention so that the modified logical page will be updated in place without any performance penalty.

Having reference now to FIG. 1A, the data compression structure is illustrated. Segmentation of data on DASD 36 is provided into multiple finite blocks or compression groups 38 (CG 0 through CG N). Each compression group 38 is managed as an integral unit with space allocated flexibly within it according to a compressed data hierarchy of the invention. Hierarchical padding is put in place when each compression group 38 is allocated. Data within each compression group 38 represents a fixed logical address range from the view of host system 12 with variations in physical size depending on the compression characteristics of the stored data. All data within a compression group 38 is stored in the same contiguous location on the DASD 36, thereby providing data locality.

A compression group 38 is not limited to any particular size; however, data storage efficiencies are realized when the compression group size is chosen to be as large or larger than the majority of data blocks that the host system 12 allocates. It should also be relatively large with respect to the system page size. The compression group size is chosen to generally match file system storage management allocation and access patterns. For an IBM AS/400 computer system 12, the compression group size has been selected to be 1 MB with a system page size of 4K. Within the compression group 38, data is stored sequentially in the order dictated by the system addressing model. Each system data page is compressed individually within the group and stored in the physical space equivalent to its compressed size. There is no requirement that compression groups 38 maintain any spatial relationship with respect to one another.

Each compression group 38 consists of a variable number of compression regions (CRs) 50, and is therefore variable in terms of physical size. As shown, each compression group 38 physically comprises an integral number of compression regions 50 (CR 0 through CR M). Compression regions 50 are used to provide a convenient granularity for managing disk space. Although any size could be used including a sector, the functionally indivisible, minimum addressable data area on DASD 36, selecting the size of the compression region 50 to match the disk geometry, for example, a track size or other implementation dependent size, is beneficial. The use of compression regions 50 is optional, although it contributes to the realization of efficient implementations. As illustrated and described with respect to the flow chart of FIG. 3, a selected number of compression regions for padding (CR PAD) are used to pad compression data storage area 40 with extra space to facilitate update in place.

In FIG. 1A, the exception and administration region (EXCP) includes the exception region 42 and the micro table directory 44. EXCP region is predefined space within the compression group 38 for compressed pages that no longer fit in the space currently allocated for them and directory data. In each compression group 38, the exception region includes a selected number of sectors, for example, 127 sectors. The exception region sectors are used to store physical pages that, including the padding and attempted sector borrowing, do not contain enough physical sectors to hold the updated compressed data. The EXCP region consists of an integral number of compression regions 50. Although the EXCP region does affect the sequential storage of data within a compression group 38, exception region 42 ensures that updated data is not stored far from its original storage space and neighboring file data. In many cases, the use of the small computer system interface (SCSI) Skip Read and Skip Write Commands allow for the acquisition of exception region stored data along with its neighboring pages in a single operation. The SCSI Skip Read and Skip Write Commands utilize a skip mask to set selected sectors to be read or written with other sectors set as zero that are skipped. Even when this cannot be accomplished, a long seek is avoided due to the close proximity of the EXCP region. Directory information to aid in the location of data within each block is kept with the data in each compression group 38. Similarly, the close proximity of the directory information to its related data minimizes DASD seeks when the directory must be accessed. In practice, directory information also is cached in the storage controller 22, minimizing updates of directory information in the compression group micro table directory 44.

The compression group 38 is further sub-divided into logical pages, which in our implementation are 4 Kbytes of uncompressed data in size and represent the smallest unit of data that may be compressed. All data is stored on the DASD 36 in an integral number of the contiguous fixed blocks or sectors, (for example, including 512 bytes). Data from 4 Kbytes logical or system pages is compressed into a physical page or compressed page (CP) 50 which uses a variable number of physical sectors 52, dependent upon that particular pages' compression ratio. The required physical sectors may be as small as 1 sector for maximum compression, or as large as 8 sectors if data compression yields no space savings. The physical pages 50 are stored on the DASD 36, and are treated as indivisible units.

Each compression region 50 includes multiple compression pages 52 (CP 1 to CP J). The size of the compression page 52 advantageously is selected to be equal to the system page size. This eliminates the need for the DASD subsystem controller 22 to perform read-modify-write operations to a compressed page 52 where only a portion of the data has been modified by the host system 12. The compression region 50 consists of a fixed number of physical sectors 54 containing a variable number of compression pages 52. Physical size of compression page 52 is 1 to n physical sectors 54 (PS 0–PS i) dependent on the particular compression ratio. Compression pages 52 may span compression regions 50 within a compression group 38.

The physical sector 54 includes compressed data 56 and an optional physical sector header 58 for control information. Sector padding is a direct result of using fixed blocks to store compressed data. The last physical sector of a physical page contains 0 to 511 bytes of unused data. Anytime compressed data is modified, if it will fit in the original sectors in which it was stored, it will be updated in place. Any growth up to the number of bytes available in the last sector will be contained.

Figure 2A:
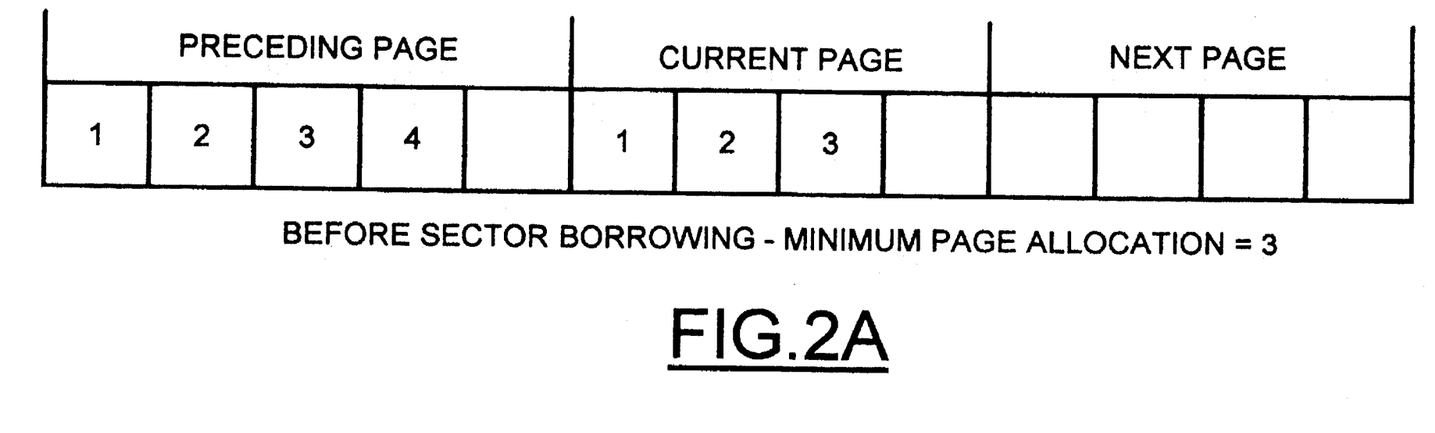
FIGS. 2A and 2B are block diagram illustrating a sector borrowing method of the invention with a minimum page allocation of three in the data compression structure of FIG. 1A.
Figure 2B:
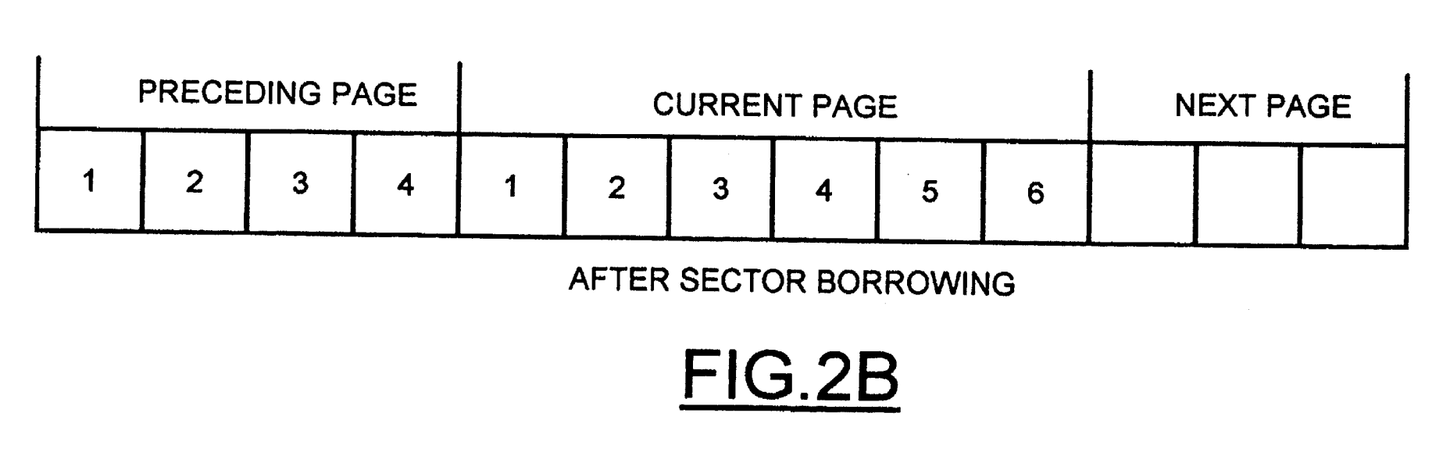

Having reference now to FIGS. 2A and 2B, a sector borrowing feature of the invention is illustrated. In FIGS. 2A and 2B, the minimum page allocation (MPA) is three sectors for each compressed page. Sector borrowing allows one physical page, which does not have enough sectors allocated to fit all of its data, to use or borrow unused sectors from adjacent physical pages. Some sector borrowing rules follow. Firstly, sectors may not be borrowed such that the adjacent pages' minimum page allocation (MPA) will be violated. Secondly, the sectors borrowed must be physically adjacent.

As shown in FIG. 2A, a current compressed page has four sectors allocated and currently contains three sectors of compressed data. The physical page immediately preceding the current page has five sectors allocated and contains four sectors of compressed data. The physical page immediately following the current page has four sectors allocated, and is currently unwritten.

FIG. 2B illustrates the current page being modified such that it requires six sectors to store the compressed data with one unused sector borrowed from the preceding page, and one unused sector from the following page. The preceding page is left with four sectors, all containing compressed data. The following page is left with three sectors, none containing data. The minimum page allocation for both the preceding page and the following page is still satisfied after the sector borrowing. The two borrowed sectors, in addition to the four currently allocated sectors, allow the modified data for the current page to be updated in place, again without performance penalty on the modified data.

Figure 3:
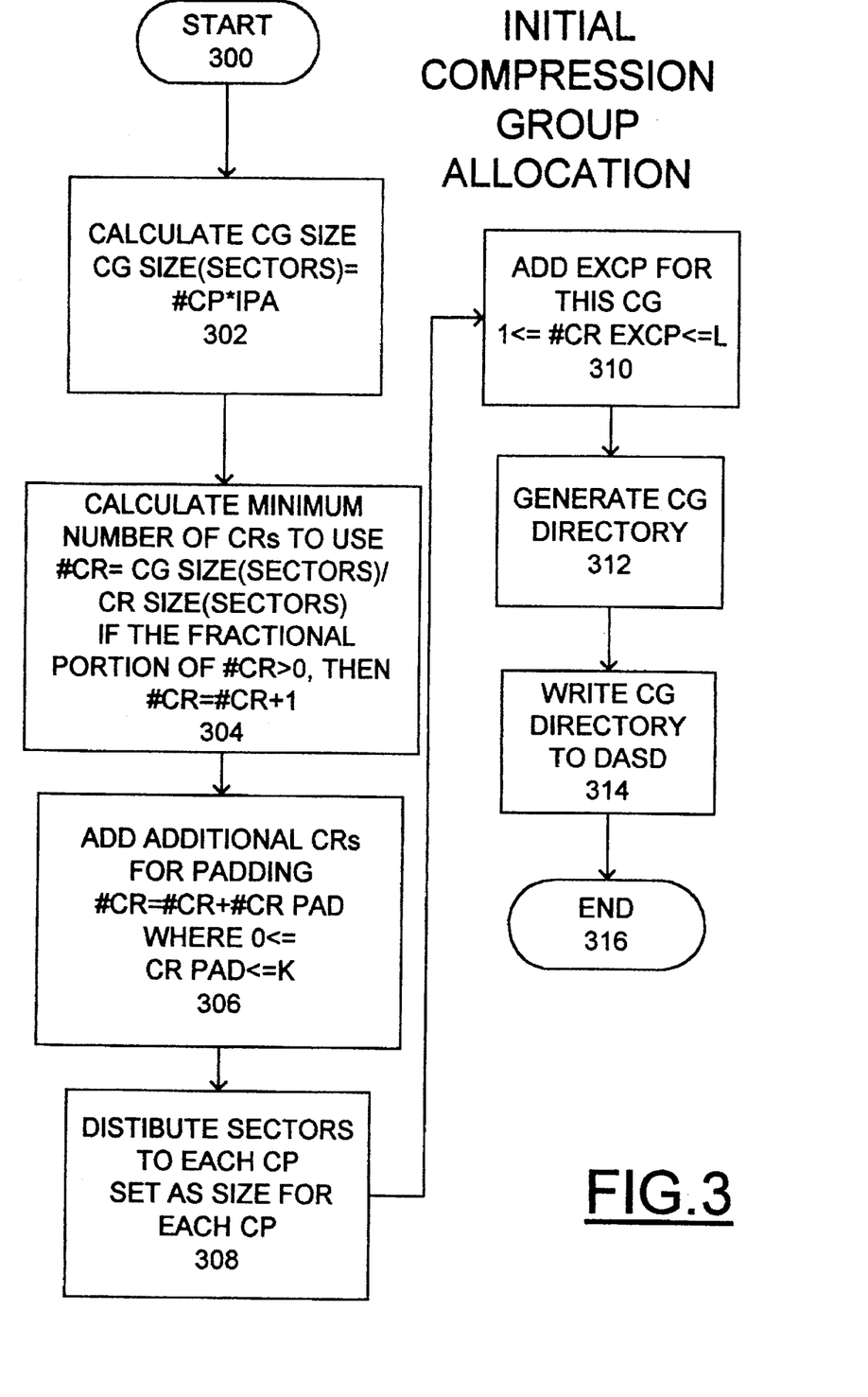
FIGS. 3, 4, 5A, 5B, 6A, and 6B are flow charts illustrating logical steps performed by a storage controller of the DASD compression system of FIG. 1 in accordance with the present invention.

Referring now to FIG. 3, there is shown a flow chart illustrating sequential steps for an initial compression group allocation where the hierarchical padding is put in place. Sequential steps begin at a block 300. Compression group size (CG SIZE) is calculated as indicated at a block 302 labeled CG SIZE (sectors)=#CP*IPA, where #CP represents the number of compressed pages and IPA represents an initial page allocation and IPA is greater than or equal to the MPA.

A minimum number of compression regions (CRs) to be used is calculated at a block 304 labeled #CR=CG SIZE (SECTORS)/CR SIZE (SECTORS), IF THE FRACTIONAL PORTION OF #CR>0, THEN #CR=#CR+1. Next additional CRs for padding are added as desired as indicated at a block 306 labeled #CR=#CR+#CR PAD WHERE 0<=#CR PAD<=K. Next padding sectors are distributed to each compressed page (CP) and an allocated space AS SIZE in a number of sectors is set for each CP as indicated at a block 308. A selected number (one through L) CRs are added for the EXCP region 42 for this CG 38 as indicated at a block 310 labeled 1<=#CR EXCP<=L. A CG directory is generated as indicated at a block 312 and then the CG directory is written as indicated at a block 314 to complete the initial compression group allocation at block 316.

Figure 4:
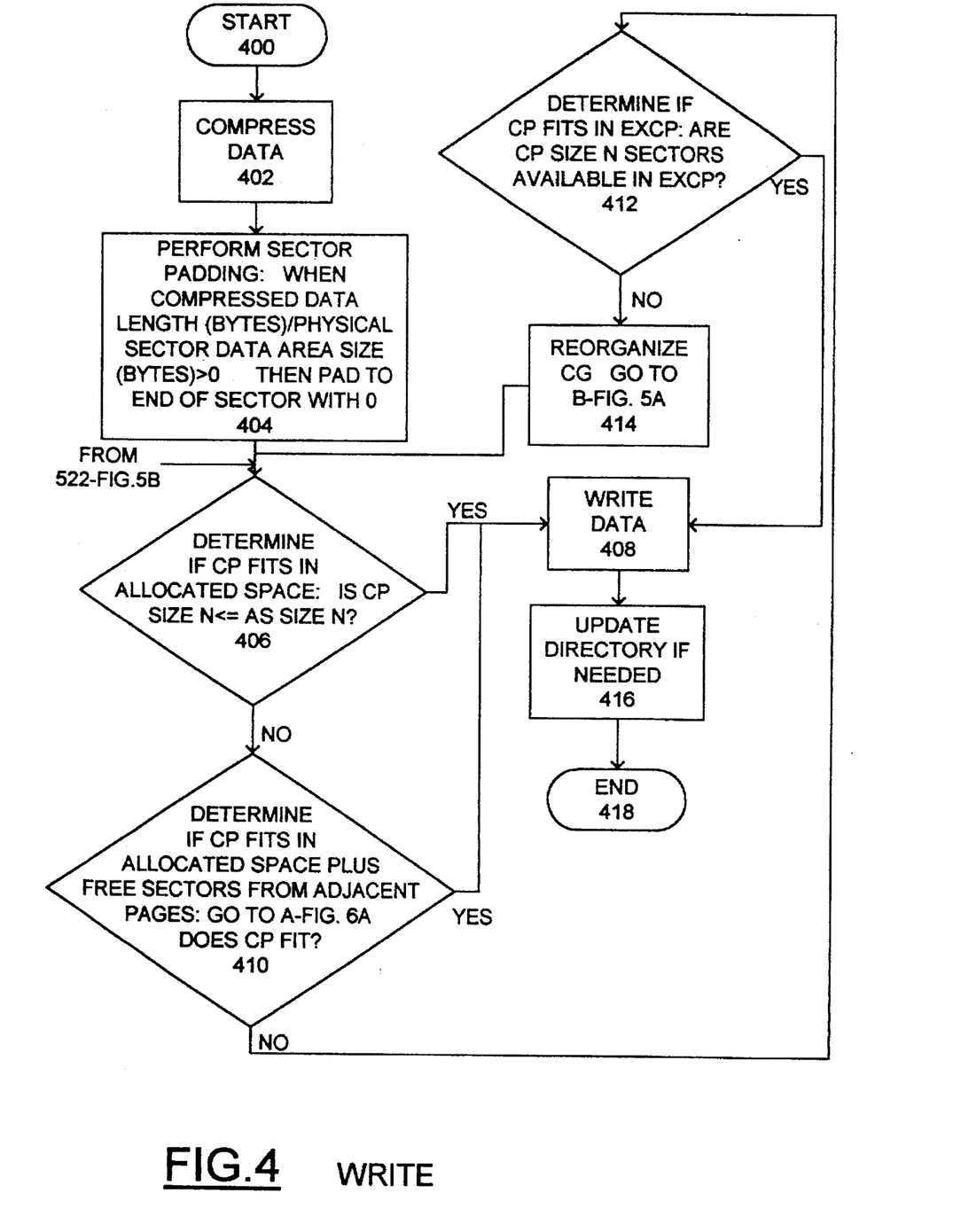

Referring now to FIG. 4, sequential steps for writing compressed data are shown where padding is dynamically used and replaced during the write operations with the minimum page allocation (MPA) feature used to control sector borrowing. Sequential write steps begin at a block 400. First data is compressed as indicated at a block 402. Sector padding is performed when the compressed data length in bytes divided by the physical sector data area size in bytes is greater than zero, then padding to the end of the sector with zeros is provided as indicated at a block 404. Next it is determined whether the compressed page (CP) fits in the allocated space as indicated at a block 406 labeled IS CP SIZE N<=AS SIZE N? When the compressed page (CP) fits within the allocated space, then the compressed data is written as indicated at a block 408.

Figure 5A:
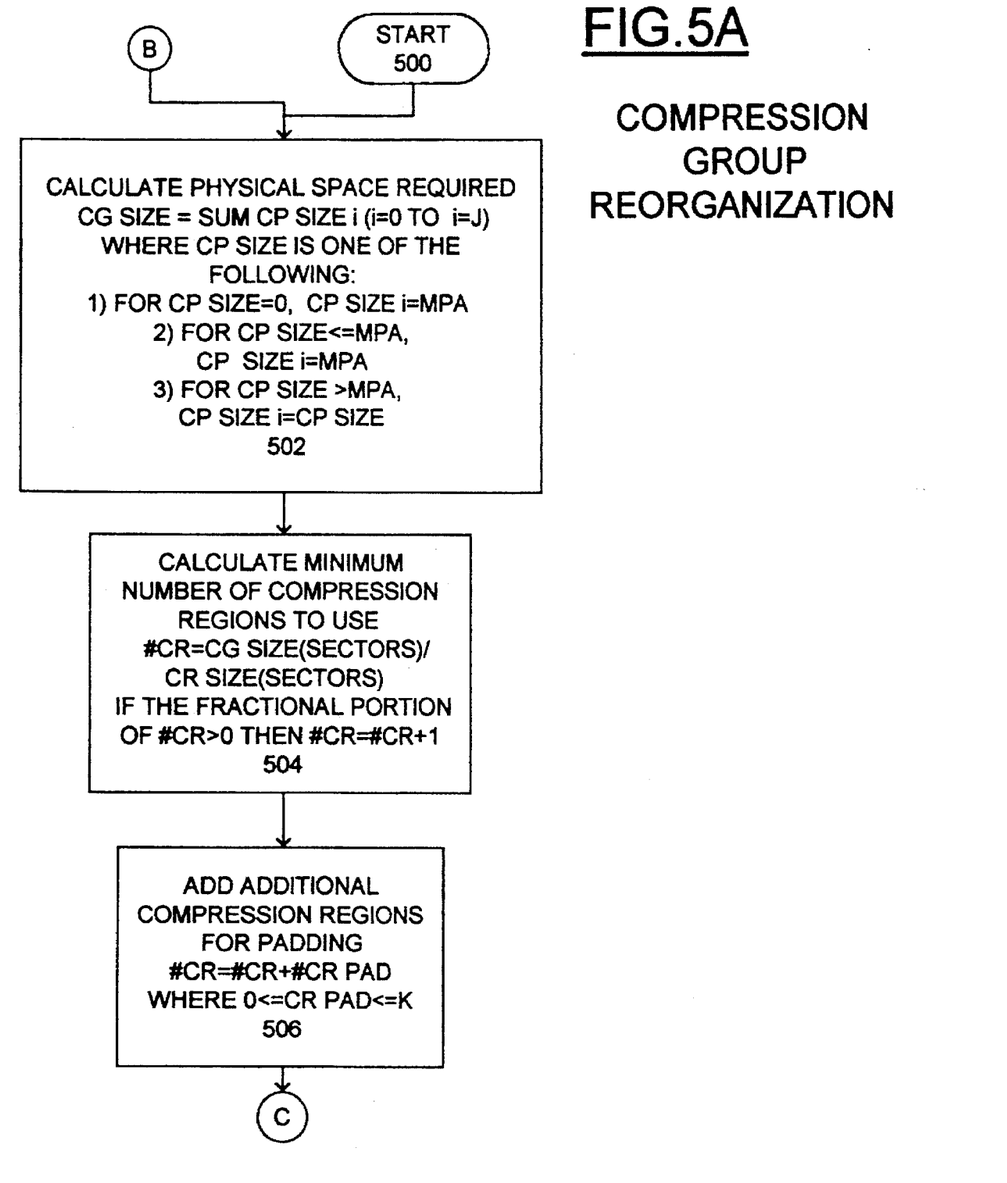
Figure 6A:
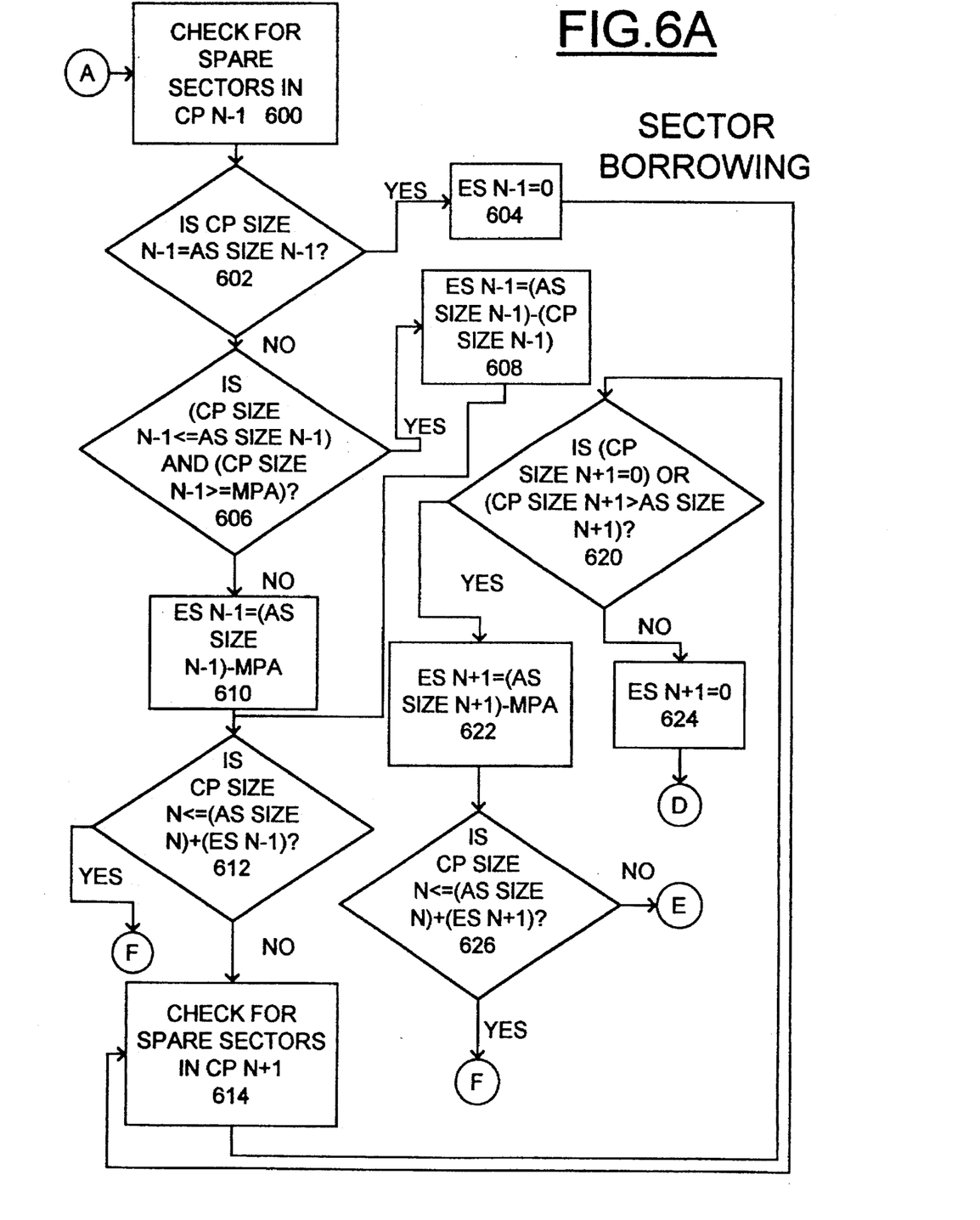

Otherwise when the compressed page (CP) is larger than the allocated space, then it is determined whether the compressed page (CP) fits within the allocated space combined with available free sectors from adjacent pages going to FIG. 6A following entry point A as indicated at a block 410. If determined that the compressed page (CP) fits within the allocated space combined with available free sectors from adjacent pages, then the compressed data is written as indicated at a block 408. Otherwise, if the compressed page (CP) does not fit within the allocated space combined with available free sectors from adjacent pages, then it is determined whether the compressed page (CP) fits within the EXCP region 42 as indicated at a block 412 labeled ARE CP SIZE N SECTORS AVAILABLE IN EXCP? If the compressed page (CP) does not fit within the EXCP region 42, then reorganization of the compression group is performed continuing with the sequential steps of FIG. 5A following entry point B as indicated at a block 414. Then the sequential steps return to block 406 and are repeated with the data written at block 408. The directory is updated if needed as indicated at a block 416 to complete the data writing operations at a block 418.

Figure 5B:
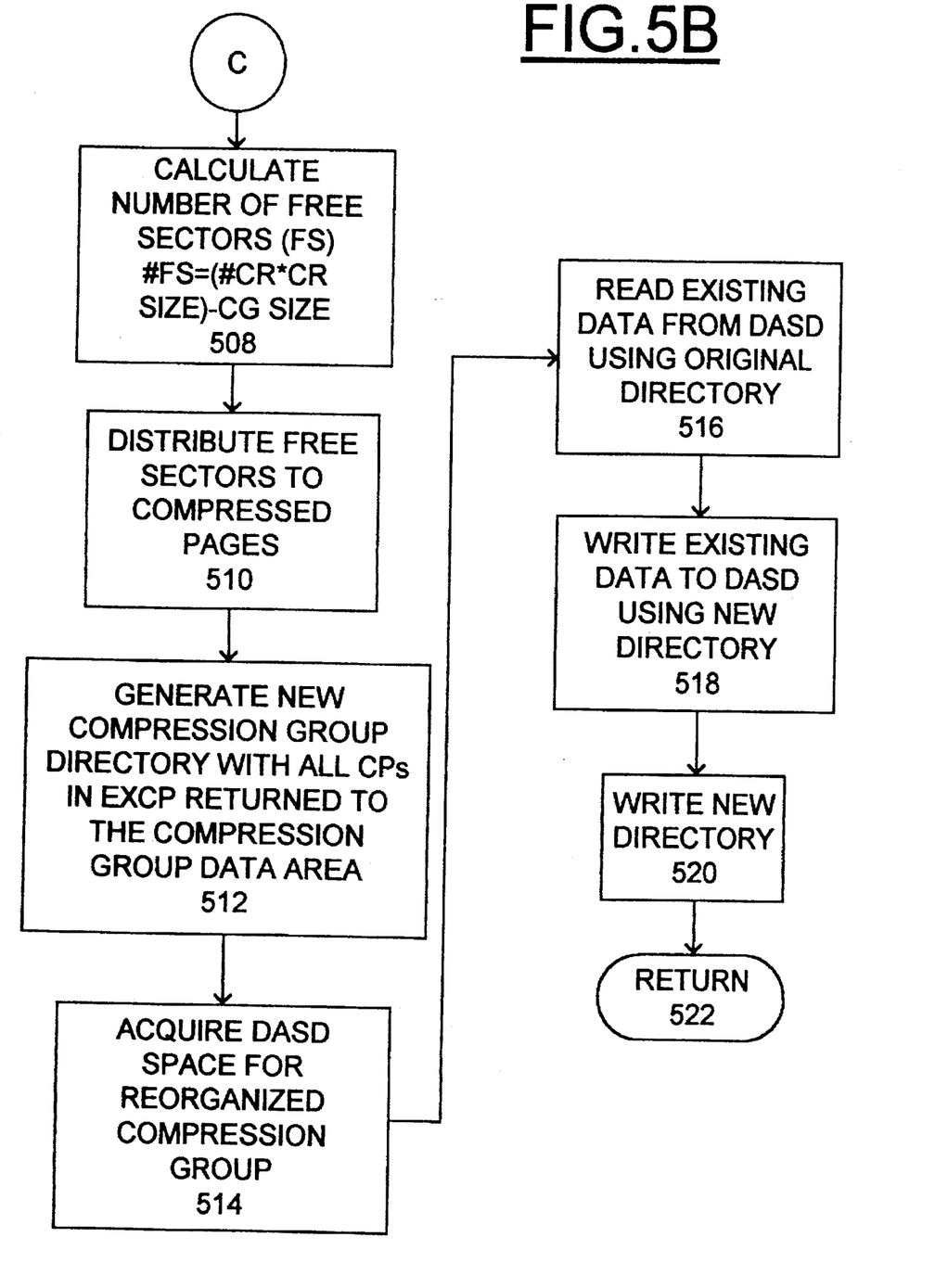

Referring now to FIGS. 5A and 5B, sequential steps for compression group reorganization are shown. Compression groups are reorganized or swept when additional physical space is required for storing a compressed page following block 414 in FIG. 4. Compression groups are also reorganized or swept when additional physical space may be freed due to changing compression characteristics. These sweeps move an entire compression group 38 from one physical location to another in order to keep DASD space efficiently used and DASD fragmentation at a minimum.

Sequential compression group reorganization steps begin at a block 500 and following entry point B in FIG. 5A. First required physical space for the particular compression group is calculated by summing the actual or minimum page allocation number of sectors for all the compression pages in the compression group at a block 502 labeled CG SIZE= SUM CP SIZE i (i=0 to i=j), WHERE CP SIZE IS ONE OF THE FOLLOWING:

1) FOR CP SIZE=0 CP SIZE i=MPA
2) FOR CP SIZE i<=MPA CP SIZE i=MPA
3) FOR CP SIZE>MPA CP SIZE i=CP SIZE i.

A minimum number of compression regions (CRs) to use is calculated at a block 504 labeled #CR=CG SIZE (sectors) /CR SIZE(sectors) IF THE FRACTIONAL PORTION OF #CR>0,#CR=#CR+1. Additional CRs are added for more padding as desired as indicated at a block 506 labeled #CR=#CR+#CR PAD WHERE 0<=CR PAD<=K.

Referring now to FIG. 5B, sequential steps for compression group reorganization continue following entry point C with calculating a number of free sectors (FSs) as indicated at a block 508 labeled #FS=(#CR*CR SIZE)–CG SIZE, where CG SIZE is the value calculated at block 502. The free sectors are those sectors which end up being unused due to compression group alignment following a compression group sweep and those sectors that have been added as padding sectors. For example, when compression groups 38 are aligned on 64 KByte boundaries, this results in 0 to 127 unused sectors at the end of the compression group, dependent on specific data compression characteristics. By adjusting the number of sectors allocated to each page within this compression group, all of these otherwise unused sectors are interspersed throughout the compression group 38. This distribution of the free sectors increases the number of sectors allocated to certain pages, and increases the opportunity for update in place and successful sector borrowing. The free sectors are distributed to compressed pages as indicated at a block 510. The free sectors can be distributed evenly between all pages CPs in the compression group or one free sector for every second compression page or one free sector for every predetermined number (n) compression pages. Alternatively, the free sectors can be sequentially distributed to predetermined compression pages based on current size, first where CP SIZE=AS SIZE; then where CP SIZE-AS SIZE=1; then where CP SIZE-AS SIZE=2 and continuing until all the free sectors are distributed.

Next a new CG directory is generated with all CPs in the EXCP region 42 returned to the CG data area 40 as indicated at a block 512. DASD space is acquired for the reorganized compression group as indicated at a block 514. The existing data is read from the DASD 36 using the original directory as indicated at a block 516. Then the existing data is written to new location based on new directory as indicated at a block 518. The exception region 42 of the reorganized compression group is now empty. A new directory is written for the compression group as indicated at a block 520. Then the sequential operations return to block 406 in FIG. 4.

Figure 6B:
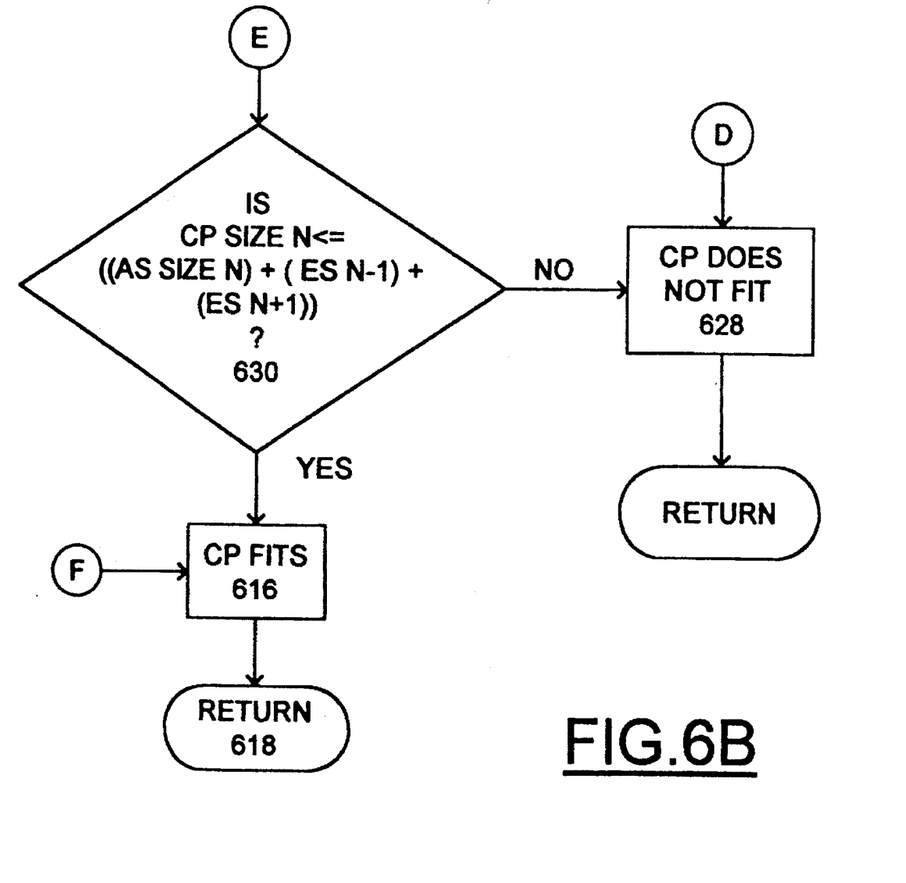

Referring now to FIGS. 6A and 6B, sequential steps for sector borrowing of available free sectors from adjacent pages in accordance with predefined rules of the invention are shown. First the compressed page size in units of sectors CP SIZE of the previous page (N-1) is checked for spare sectors as indicated at a block 600. Then the previous page compressed page size CP SIZE N-1 is compared with the allocated space (AS SIZE N-1) in units of sectors for it as indicated at a block 602. If the compressed page size CP SIZE N-1 is equal to the allocated space AS SIZE N-1, then the number of available or extra sectors (ES) is set to zero as indicated at a block 604. Otherwise, if the compressed page size CP SIZE N-1 is not equal to the allocated space AS SIZE N-1, then it is determined whether both the compressed page size CP SIZE N-1 is less than or equal to the allocated space AS SIZE N-1 and the compressed page size CP SIZE N-1 is greater than or equal to the minimum page allocation (MPA) in units of sectors as indicated at a block 606.

If the compressed page size CP SIZE N-1 is less than or equal to the allocated space AS SIZE N-1 and the compressed page size CP SIZE N-1 is greater than or equal to the minimum page allocation (MPA), then the number of extra sectors ES of the previous page is calculated by subtracting the compressed page size from the allocated page space as indicated at a block 608 labeled ES N-1=(AS SIZE N-1)– (CP SIZE N-1). If compressed page size CP SIZE N-1 is not less than or equal to the allocated space AS SIZE N-1 and/or the compressed page size CP SIZE N-1 is not greater than or equal to the minimum page allocation (MPA), the number of extra sectors ES of the previous page is calculated by subtracting the minimum page allocation from the compressed page size as indicated at a block 610 labeled ES N-1=AS SIZE N-1-MPA.

After the number of extra sectors ESs of the previous page are calculated, then it is determined whether the compressed page size of the current page is less than or equal to the sum of the allocated space of the current page combined with the extras sectors of the previous page as indicated at a block 612 labeled CP SIZE N<=AS SIZE N+ES N-1? If the compressed page size of the current page is not less than or equal to the sum of the allocated space of the current page combined with the extras sectors of the previous page, then the next page following the current page is checked for extra sectors as indicated at a block 614.

Otherwise, if the compressed page size of the current page is less than or equal to the sum of the allocated space of the current page combined with the extras sectors of the previous page, then the compressed page fits as indicated at a block 616 in FIG. 6B following entry point F. Then the sequential operations return to block 406 in FIG. 4 as indicated at a block 618.

After the next page is checked for extra sectors at block 614, then it is determined whether the next page is currently unwritten or the next page compressed page size CP SIZE N+1 is greater than the allocated space AS SIZE N+1 as indicated at a block 620. If yes, then the next page extra sectors are calculated as indicated at a block 622 labeled ES N+1=AS SIZE N+1-MPA. If no, then the next page extra sectors are set to zero as indicated at a block 624 labeled ES N+1=0. Then the compressed page does not fit as indicated at a block 628 in FIG. 6B following entry point D.

After the next page extra sectors are calculated at block 622, it is determined whether the current compressed page size is less than or equal to the allocated space and the next page extra sectors as indicated at a block 626. If the current compressed page size is less than or equal to the allocated space and the next page extra sectors, then the compressed page fits at block 616 in FIG. 6B following entry point F. Then the sequential operations return to block 406 in FIG. 4. If the current compressed page size is not less than or equal to the allocated space and the next page extra sectors, then it is determined whether the current compressed page size is less than or equal to the current page allocated space combined with the extra sectors of both the previous and next pages as indicated at a block 630 in FIG. 6B following entry point E. If yes, then the compressed page fits at block 616. If no, then the compressed page does not fit at block 628. Then the sequential operations return to block 406 in FIG. 4.

Figure 7:
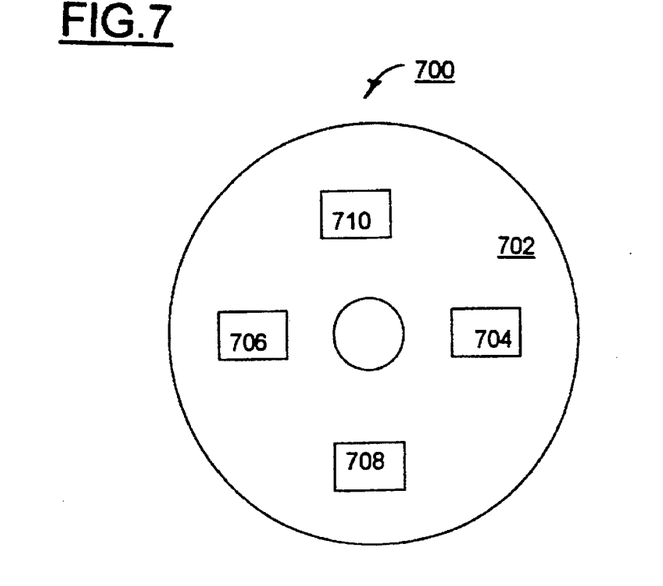
FIG. 7 is a block diagram illustrating a computer program product in accordance with the invention.

Referring now to FIG. 7, an article of manufacture or a computer program product 700 of the invention is illustrated. The computer program product 700 includes a recording medium 702, such as, a floppy disk, a high capacity read only memory in the form of an optically read compact disk or CD-ROM, a tape, or a similar computer program product. Recording medium 702 stores program means 704, 706, 708, 710 recorded on the medium 702, for carrying out the methods of this invention in the system 10 of FIG. 1.

A sequence of program instructions or a logical assembly of one or more interrelated modules defined by the recorded program means 704, 706, 708, 710, direct the storage controller 22 to perform the compression data storage method and to implement the hierarchical padding structure of the invention.

In brief summary, the hierarchical padding structure and compression data storage method of the invention enable compressed data growth as it is modified to be accommodated with minimal impact to the user's overall performance. The hierarchical padding structure and compression data storage method of the invention balance performance and the overall compression ratio and make DASD data compression a realistic option in environments where data is continually updated and modified. As a result, DASD data compression can be used on interactive and transaction processing systems to provide increased DASD capacity and lower system cost without sacrificing overall system performance.

While the present invention has been described with reference to the details of the embodiments of the invention shown in the drawing, these details are not intended to limit the scope of the invention as claimed in the appended claims.

What is claimed is:

1. A data compression hierarchical padding structure for a computer readable direct access storage device (DASD) using fixed block architecture (FBA) comprising:

storage, wherein said storage contains at least one compression group;

each compression group having a fixed logical size including a selected number of compressed data pages with an initial page allocation of a number of sectors;

each compression group having a selected minimum page allocation defining a minimum number of sectors allocated for each logical compressed data page; and each compression group having a selected number of additional padding sectors; said padding sectors being distributed to said selected number of compressed data pages.

2. A data compression hierarchical padding structure for a direct access storage device (DASD) as recited in claim 1 wherein each compression group includes a minimum number of compression regions and a selected number of additional padding compression regions providing said selected number of additional padding sectors.

3. A data compression hierarchical padding structure for a direct access storage device (DASD) as recited in claim 1 wherein said initial page allocation of said number of sectors is greater than or equal to said minimum page allocation.

4. A data compression hierarchical padding structure for a direct access storage device (DASD) as recited in claim 1 wherein each compression group includes at least one compression region defining an exception region for storing a compression group directory and updated compressed data which exceeds an original storage space for corresponding original compressed data.

5. A data compression hierarchical padding structure for a direct access storage device (DASD) as recited in claim 1 wherein compressed data pages have a logical size equal to a host system page size.

6. A method for storing compressed data in a direct access storage device (DASD) using fixed block architecture (FBA) comprising the computer executable steps of:

selecting a minimum page allocation to define a minimum number of sectors allocated for each logical compressed data page;

segmenting the DASD into at least one compression group; each compression group having a fixed logical size and including a selected number of compressed data pages with an initial page allocation of a number of sectors; said initial page allocation being greater than or equal to said minimum page allocation;

allocating a minimum number of compressed data regions within each compression group;

allocating a selected number of additional compressed data regions including a plurality of sectors for padding within each compression group;

distributing said plurality of padding sectors between said compressed data pages;

allocating an exception region within each compression group; and writing compressed data and updated compressed data to a selected compressed data page.

7. A method for storing compressed data in a direct access storage device (DASD) as recited in claim 6 wherein the step of writing compressed data and updated compressed data to said selected compressed data page includes the steps of:

comparing the size of the compressed data or updated compressed data with an allocated space for said selected compressed data page; and when said allocated space is greater than or equal to the size of the compressed data or updated compressed data, writing the compressed data or updated compressed data within said allocated space.

8. A method for storing compressed data in a direct access storage device (DASD) as recited in claim 7 further includes the step of:

when said allocated space is less than the size of the compressed data or updated compressed data, comparing the size of the compressed data or updated compressed data with said allocated space for said selected compressed data page combined with free sectors from adjacent pages.

9. A method for storing compressed data in a direct access storage device (DASD) as recited in claim 8 further includes the step of:

when said allocated space combined with free sectors from adjacent pages is greater than or equal to the size of the compressed data or updated compressed data, writing the compressed data or updated compressed data within said allocated space combined with free sectors from adjacent pages.

10. A method for storing compressed data in a direct access storage device (DASD) as recited in claim 9 further includes the step of:

when said allocated space combined with free sectors from adjacent pages is less than the size of the compressed data or updated compressed data, comparing the size of the compressed data or updated compressed data with available space in said exception region.

11. A method for storing compressed data in a direct access storage device (DASD) as recited in claim 10 further includes the step of:

when said available space in said exception region is greater than or equal to the size of the compressed data or updated compressed data, writing the compressed data or updated compressed data within said available space in said exception region.

12. A method for storing compressed data in a direct access storage device (DASD) as recited in claim 11 further includes the step of:

when said available space in said exception region is less than the size of the compressed data or updated compressed data; reorganizing said compression group.

13. A method for storing compressed data in a direct access storage device (DASD) as recited in claim 12 wherein the step of reorganizing said compression group includes the steps of:

identifying an amount of DASD physical space required for the compression group utilizing an original compression group directory and said selected minimum page allocation, allocating a minimum number of compressed data regions within the compression group;

allocating a selected number of additional compressed data regions including a plurality of sectors for padding within the compression group;

distributing said plurality of padding sectors between said compressed data pages;

allocating an exception region within the compression group; and generating a new compression group directory with all compressed data of said identified compression group reordered in ascending host logical block address sequence with said exception region being empty in a new compression group.

14. A method for storing compressed data in a direct access storage device (DASD) as recited in claim 13 further includes the steps of:

utilizing said original compression group directory to read all data in said compression group; and utilizing said generated new compression group directory to write all data in said new compression group.

15. A method for storing compressed data in a direct access storage device (DASD) using fixed block architecture (FBA) comprising the computer executable steps of:

selecting a minimum page allocation to define a minimum number of sectors allocated for each logical compressed data page;

segmenting the DASD into at least one compression group; each compression group having a fixed logical size;

allocating a selected number of compressed data pages with an initial page allocation of a number of sectors within each compression group; said initial page allocation being greater than or equal to said minimum page allocation;

distributing a selected number of padding sectors to said selected number of compressed data pages; and when writing compressed data to a selected compressed data page, dynamically using said padding sectors and available extra sectors from adjacent compressed data pages.

16. A computer program product for use in a computer system having a processor, and a direct access storage device (DASD) using fixed block architecture (FBA), the computer program product comprising:

a computer readable recording medium;

means, recorded on the recording medium, for selecting a minimum page allocation to define a minimum number of sectors allocated for each logical compressed data page;

means, recorded on the recording medium, for segmenting the DASD into at least one compression group; each compression group having a fixed logical size and including a selected number of compressed dam pages with an initial page allocation of a number of sectors; and having a selected number of additional padding sectors; said padding sectors being distributed to said selected number of compressed data pages; and means, recorded on the recording medium, for writing compressed data and updated compressed data to a selected compressed data page.

17. A computer program product as recited in claim 16 wherein said means, recorded on the recording medium, for writing compressed data and updated compressed data to said selected compressed data page include;

means for comparing the size of the compressed data or updated compressed data to be written with an allocated space for said selected compressed data page; and     means, responsive to said allocated space being greater than or equal to the size of the compressed data or updated compressed data, for writing the compressed data or updated compressed data within said allocated space.

18. A computer program product as recited in claim 17 further includes;

means, responsive to said allocated space being less than the size of the compressed data or updated compressed data, for identifying free sectors from adjacent pages and for comparing the size of the compressed data or updated compressed data with said allocated space for said selected compressed data page combined with free sectors from adjacent pages.

19. A computer program product as recited in claim 18 further includes;

means, responsive to said allocated space combined with free sectors from adjacent pages being greater than or equal to the size of the compressed data or updated compressed data, for writing the compressed data or updated compressed data within said allocated space combined with free sectors from adjacent pages.

20. A computer readable storage device, comprising: storage, wherein said storage contains at least one compression group;

each compression group having a fixed logical size including a selected number of compressed data pages with an initial page allocation of a number of sectors;

each compression group having a selected minimum page allocation defining a minimum number of sectors allocated for each logical compressed data page; and     each compression group having a selected number of additional padding sectors; said padding sectors being distributed to said selected number of compressed data pages.

21. The storage device as recited in claim 20, wherein each compression group further comprises a minimum number of compression regions and a selected number of additional padding compression regions providing said selected number of additional padding sectors.

22. A storage device as recited in claim 20, wherein said initial page allocation of said number of sectors is greater than or equal to said minimum page allocation.

23. A storage device as recited in claim 20, wherein each compression group further comprises at least one compression region defining an exception region for storing a compression group directory and updated compressed data which exceeds an original storage space for corresponding original compressed data.

24. A storage device as recited in claim 20, wherein compressed data pages have a logical size equal to a host system page size.

* * * * *

UNITED STATES PATENT AND TRADEMARK OFFICE
CERTIFICATE OF CORRECTION

PATENT NO. : 5,666,560

DATED : September 9, 1997

INVENTOR(S) : Daniel F. Moertl, John D. Stevens, Gene S. Van Grinsven, and Bruce M. Walk It is certified that error appears in the above-indentified patent and that said Letters Patent is hereby corrected as shown below:

Claim 16, Col. 12, Line 60, "dam" should be --data--.

Signed and Sealed this

Eleventh Day of November, 1997

Attest:

BRUCE LEHMAN

Attesting Officer

Commissioner of Patents and Trademarks